(12) United States Patent
Aydin et al.

(10) Patent No.: US 8,675,520 B2
(45) Date of Patent: Mar. 18, 2014

(54) UPLINK COMMUNICATION IN A WIRELESS COMMUNICATION NETWORK

(75) Inventors: Osman Aydin, Stuttgart (DE); Stephen Kaminski, Eislingen (DE)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/266,097

(22) PCT Filed: Apr. 15, 2010

(86) PCT No.: PCT/EP2010/054957
§ 371 (c)(1),
(2), (4) Date: Oct. 24, 2011

(87) PCT Pub. No.: WO2010/124939
PCT Pub. Date: Nov. 4, 2010

(65) Prior Publication Data
US 2012/0044872 A1    Feb. 23, 2012

(30) Foreign Application Priority Data

Apr. 27, 2009    (EP) ..................................... 09290307

(51) Int. Cl.
*H04L 12/28*    (2006.01)
*H04W 36/00*    (2009.01)

(52) U.S. Cl.
USPC .......... 370/255; 370/278; 370/332; 455/439; 455/63.1; 455/67.13; 455/114.2

(58) Field of Classification Search
USPC .............. 370/255, 278, 310.2, 312, 328, 331, 370/332, 334; 455/436–439, 442–443, 455/63.1, 67.13, 114.2, 278.1
See application file for complete search history.

(56) References Cited

U.S. PATENT DOCUMENTS

| | | | |
|---|---|---|---|
| 2007/0253372 A1* | 11/2007 | Nakayasu | 370/331 |
| 2009/0233594 A1* | 9/2009 | Duschesne et al. | 455/423 |
| 2010/0189038 A1* | 7/2010 | Chen et al. | 370/328 |
| 2012/0044872 A1* | 2/2012 | Aydin et al. | 370/328 |

OTHER PUBLICATIONS

Alcatel-Lucent Shanghai Bell et al., "Uplink Coordinated Multi-Point Reception with Distributed Inter-Cell Interference Suppression for LTE-A," $3^{rd}$ Generation Partnership Project (3GPP), 3GPP TSG RAD WG1 Meeting #56bis, R1-091622, Seoul, Korea, XP050339165, pp. 1-4, Mar. 23-27, 2009.
International Search Report for PCT/EP2010/054957 dated Jul. 8, 2010.

* cited by examiner

*Primary Examiner* — Benjamin H Elliott, IV
(74) *Attorney, Agent, or Firm* — Fay Sharpe LLP

(57) ABSTRACT

The invention provides a method of operating a first base station (100) as a reception station for a wireless uplink communication connection with a wireless appliance (102), wherein the method comprises: controlling the wireless uplink communication with the wireless appliance, receiving a signal (127) from the wireless appliance, receiving a rest signal (126) from at least one second base station (104), and analyzing the rest signal from the at least one second base station for detecting a signal (129) from the wireless appliance that is above a threshold.

12 Claims, 4 Drawing Sheets

UPLINK COMMUNICATION IN A WIRELESS COMMUNICATION NETWORK

BACKGROUND OF THE INVENTION

A base station of a wireless communication network typically receives different kinds of signals. A wireless appliance communicating with a base station sends a signal to that base station that is processed by the base station. Each base station also receives noise and interference signals from other wireless appliances that communicate with other base stations. The interferences and the noise are filtered out by the base station for the wireless communication with the wireless appliance.

For example, when a wireless appliance is connected to a first base station while the wireless appliance is located in a region where a connection to a second base station would also be possible, the second base station receives a high interference signal from the wireless appliance that is filtered out by the signal processing unit of the second base station.

SUMMARY OF THE INVENTION

Embodiments of the invention provide a method of operating a first base station, a computer program product for operating the first base station, a method of operating a second base station, a computer program product for operating the second base station and a base station apparatus being operable to perform the methods in the independent claims. Embodiments of the invention are described in the dependent claims.

It is the object of the invention to improve the uplink communication of a wireless appliance in a wireless communication network. For this purpose the wireless uplink communication of the wireless appliance is controlled by a first base station that receives a signal from the wireless appliance. At least one of the other second base stations of the wireless communication network receives an interference signal from the wireless appliance and additionally some noise. The interference signals and the noise are called rest signal. This rest signal is received by the first base station that controls the uplink communication connection with the wireless appliance from the at least one second base station. The first base station analyzes the rest signal from the at least one second base station for detecting the interference signal of the wireless appliance whose connection is controlled by the first base station. The rest signal is used for improving the wireless uplink communication connection with the wireless appliance by filtering out the noise and using the interference as a source of uplink communication data.

In an embodiment of the invention the first base station that controls the wireless uplink communication connection with the wireless appliance utilizes the rest signal of the at least one second base station for determining the signal power of the wireless appliance in the rest signal and for the wireless uplink communication connection if the rest signal contains a signal from the wireless appliance that is above a threshold A.

The threshold A can be fixed so that it is used to determine a minimum level of the signal power. Below this minimum level it is not advantageous to take the rest signal into account for the wireless uplink communication connection with the wireless appliance.

Advantageously, the threshold A has a dynamic character. For example, it can be adjusted to the signal level of the wireless uplink communication connection between the wireless appliance and the first base station.

Advantageously, the threshold A is defined differentially. A differential measurement of the signal power of the wireless appliance in the rest signal, that is sent from one of the at least one second base station to the first base station, results in a measurement of the change of the signal power of the wireless appliance in the rest signal. When defining a differential threshold A for the differential measurement of the signal power, the decision if the rest signal is used by the first base station for the wireless uplink communication connection is based on the change of the signal power. By using an extrapolation algorithm it is conceivable how the power of the signal of the wireless appliance in the rest signal develops. This means that the rest signal can be utilized for the wireless uplink communication connection when it is conceivable that the signal power rises in a predefined grade and the rest signal can be ignored when it is conceivable that the signal power diminishes in a predefined grade.

In an embodiment of the invention the rest signal contains a signal that is above a certain threshold A from the wireless appliance whose connection is controlled by the first base station and the first base station decides to transfer the control of the wireless uplink communication connection with the wireless appliance to one of the at least one second base stations. For this purpose the first base station sends a transfer request message to the one of the at least one second base station where the control of the wireless uplink communication connection shall be transferred to. The decision if the control of the wireless uplink communication connection with the wireless appliance shall be transferred to a second base station is based on the rest signal that is received by the first base station from the at least one second base station. The transfer of the control of the wireless uplink communication connection can be done for example by a handover process or fast cell selection.

In an embodiment of the invention the first base station ignores the rest signal from the at least one second base station for the uplink communication connection with the wireless appliance. This decision can for example be made after the first base station has analyzed the rest signal and has detected that there is no signal that is above a certain threshold A.

Preferably the invention is used in coordinated multipoint (CoMP) reception schemes that are potential candidates for LTE advanced (Long Term Evolution), see 3GPP (third generation partnership project) specification TR36.814 V0.4.1 (2009-02), and WiMAX, IEEE 802.16e-2005.

In a coordinated multipoint reception (CoMP) network the first base station decides if one of the at least one second base station is added to the coordinated multipoint wireless uplink communication with the wireless appliance. This decision can also be made from a central network element that controls the wireless uplink communication of the wireless appliance instead of the first base station. The first base station is called CoMP master and the at least one second base station is a CoMP slave.

A transfer request message can be sent to the one of the at least one second base station after the analysis of the rest signal has shown that the rest signal contains a signal that is above a certain threshold B so that it can be advantageous to transfer the control of the wireless uplink communication with the wireless appliance to one of the at least one second base stations.

Advantageously, the communication between the first base station and the at least one second base station is done via a logical X2 interface.

In another aspect, the invention provides a computer program product comprising machine executable instructions for performing any of the above mentioned methods on a base station. The base station comprises a computer system, a microprocessor and/or a microcontroller. This is advantageous, because the machine executable code can be used for automating the above mentioned procedures.

In another aspect, the invention provides a method of operating a second base station for processing signals from at least one wireless appliance. The wireless uplink communication connection of the wireless appliance is not controlled by the second base station. The second base station does not receive the direct uplink communication signal from the wireless appliance, only a rest signal consisting of noise and an interference signal from the wireless appliance. The second base station can provide the rest signal to a first base station.

In another embodiment, the rest signal provided from the second base station to the first base station contains a signal that is above a certain threshold A from the wireless appliance that is connected to the first base station via a wireless uplink communication connection controlled by the first base station.

In another embodiment, the second base station receives a transfer request message from the first base station and the control of the wireless uplink communication connection of the wireless appliance is transferred from the first base station to the second base station which can be done for example by a handover procedure or fast cell selection. The second base station can decline the transfer request message.

In another embodiment, the rest signal that is provided from the second base station to the first base station does not contain a signal that is above a certain threshold A from a wireless appliance whose wireless uplink communication connection is controlled by the first base station. Even so, the second base station can continue providing the rest signal to the first base station.

In another embodiment, the first base station is part of a coordinated multipoint wireless uplink communication with the wireless appliance and the second base station can be added to the coordinated multipoint wireless uplink communication with the wireless appliance by the first base station or a central network element. Advantageously, this is done when the second base station provides a rest signal that contains a signal for the wireless uplink communication between the wireless appliance and the first base station that is above a certain threshold A.

In another embodiment, the second base station receives a transfer request message from the first base station or the central network element and the control of the wireless uplink communication with the wireless appliance is transferred from the first base station or the central network element to the second base station. Advantageously, this is done when the rest signal from the second base station contains a signal for the wireless communication connection that is above a certain threshold B or has other advantages compared to the uplink communication signal from the wireless appliance to the first base station.

In another aspect the invention provides a computer program product comprising machine executable instructions for performing the methods mentioned above of operating a second base station for processing signals from at least one wireless appliance in order to provide a rest signal to a first base station.

In another aspect, the invention provides a base station apparatus being operable to perform any of the method steps described above.

Advantageously, a base station can function as a base station that controls the wireless uplink communication connection of at least one first wireless appliance and at the same time as a second base station for at least one second wireless appliance.

BRIEF DESCRIPTION OF THE DRAWINGS

In the following preferred embodiments of the invention will be described, by way of example only, and with reference to the drawings in which.

DETAILED DESCRIPTION

Like numbered elements in these figures are either identical elements or perform the same function. Elements which have been discussed previously will not necessarily be discussed in later figures if the function is identical.

Figure 1:
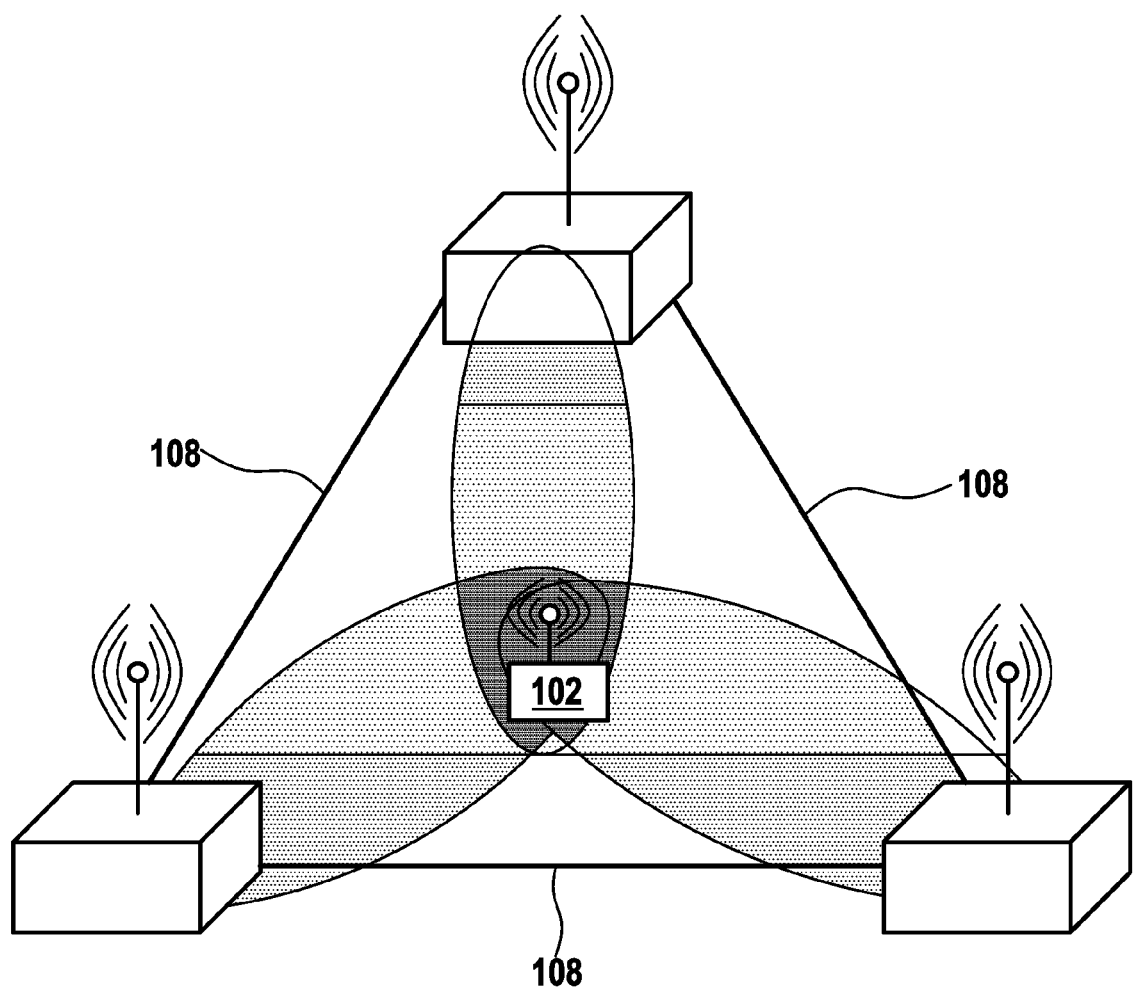
FIG. 1 illustrates the situation where a first base station controls the coordinated multipoint reception of the wireless uplink communication connection with a wireless appliance.

FIG. 1 illustrates the situation where a first base station 100 controls the wireless uplink communication connection of a wireless appliance 102. The first base station 100 acts as a master of a coordinated multipoint (CoMP) reception network. This means the first base station has the control of the wireless uplink communication. The two second base stations 104, 106 receive an interference signal from the wireless appliance 102. The two second base stations 104, 106 provide their rest signals to the first base station, the CoMP master 100, for example on request by the CoMP master or periodically. The two second base stations are called CoMP slaves.

The rest signal consists of noise and interferences from wireless appliances in the transmission area of the two second base stations 104, 106. The rest signal can be received by the first base station 100 for example via a X2 interface 108. After reception of the rest signals the first base station 100 analyzes the rest signal for detecting an appropriate signal level of the wireless appliance 102 in the rest signal of one of the second base stations 104, 106. Based on this analysis the first base station 100 decides if one of the second base stations 104, 106 is added to the CoMP reception network for the wireless appliance 102. The first base station 100 that functions as a CoMP master can also remove one of the second base stations 104, 106 from the CoMP reception network if the signal level has no benefit to the wireless uplink connection of the wireless appliance 102. The CoMP master functionality can be moved from the first base station 100 to one of the second base stations 104, 106 if the signal of the wireless appliance 102 in the rest signal from one of the second base stations 104, 106 is above a certain threshold B.

Figure 2:
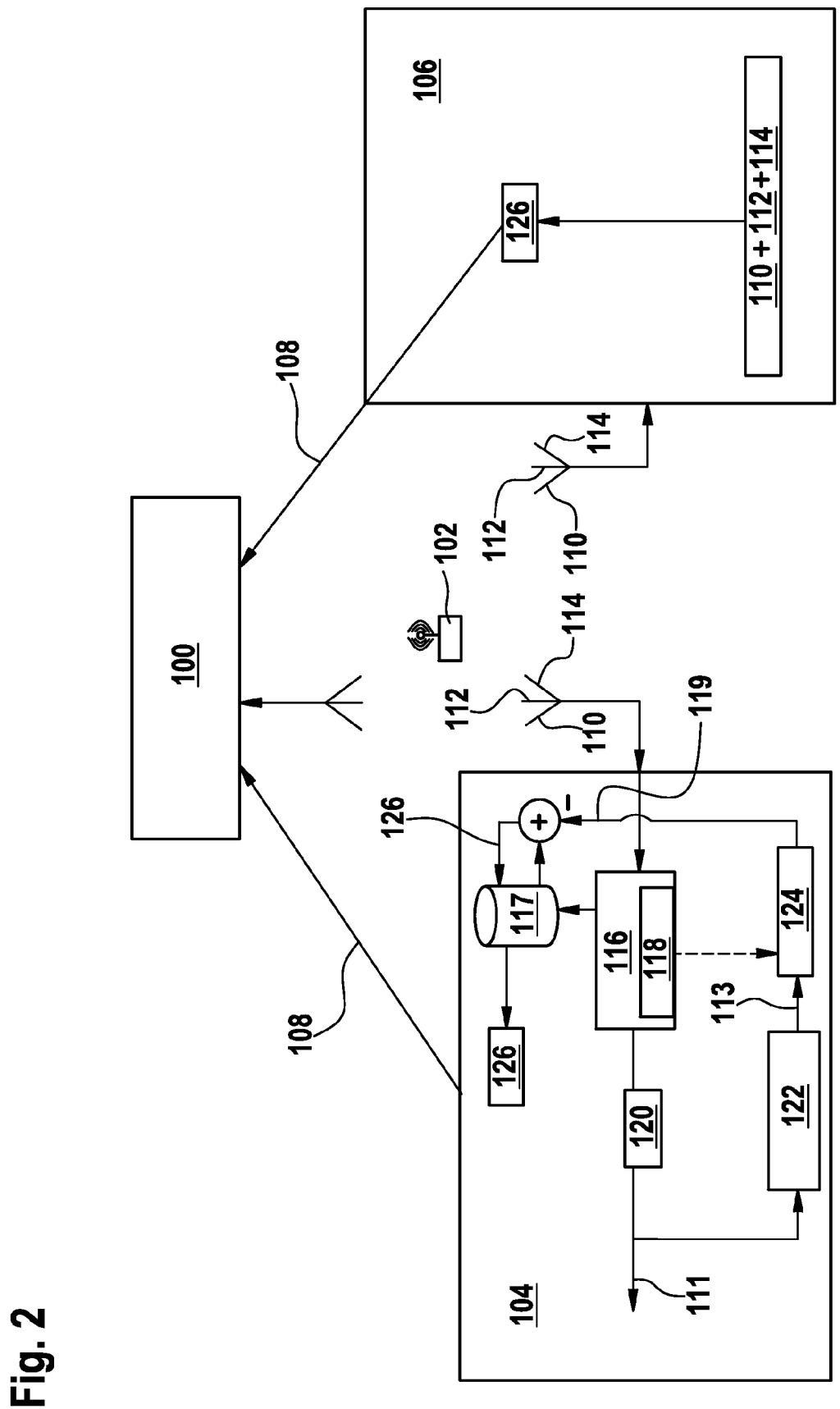
FIG. 2 illustrates the signal processing in the second base station and the subsequent providing of a rest signal to the first base station.

FIG. 2 shows a more detailed illustration of an embodiment of the invention. The wireless uplink communication connection of the wireless appliance 102 is controlled by the first base station 100 that functions as the CoMP master. The second base stations 104, 106 receive signals from the wireless appliances whose connections they control 110, interferences 112 also from the wireless appliance 102 and noise 114. The signals 110, the interferences 112 and the noise 114 are transmitted by the receiver 116 to the signal buffer 117 once per transmit time interval. The receiver 116 performs the channel estimation 118. The acknowledgement for the signal 110 is done by a CRC check 120. If the CRC check 120 is successful the uplink data 111 from the signal 110 is processed in the base station 104. The transmit signal estimator 122 estimates the estimated transmitted radio signal 113 that was transmitted by the wireless appliance. With the help of the channel estimation 118 the received signal estimator 124 generates the estimated received signal 119.

Per successfully received uplink data 111 the estimated received signal 119 is subtracted from the signal that is buffered in the signal buffer 117 consisting of the signal 110, the interferences 112 and the noise 114 such that the rest signal 126 consists of the interferences and the noise. The rest signal 126 is again buffered in the signal buffer 117 and then transmitted to the first base station 100 via an X2 interface 108 for example.

The same procedure is done in the second base station 106 that also receives signal data 110, interferences 112 and noise 114. The data is processed in the same way as in the second base station 104. The rest signal 126 is transmitted to the first base station 100 via an X2 interface 108 for example.

Figure 3:
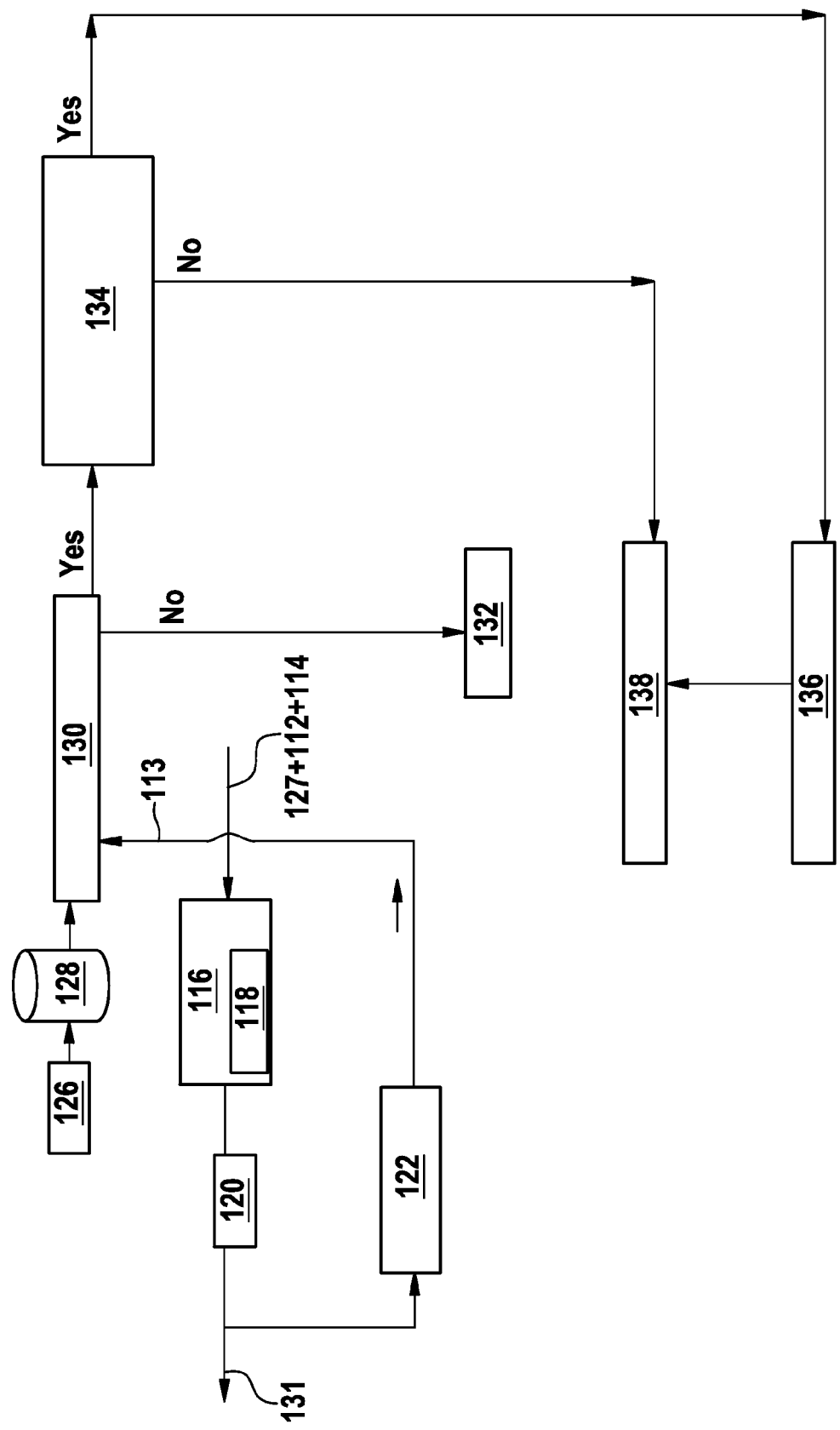
FIG. 3 illustrates the processing of the rest signal provided by the second base station to the first base station in the first base station.

FIG. 3 is a flowchart showing the processes in the first base station 100. The first base station 100 receives signals 127 from the wireless appliances whose connections it controls, interferences 112 and noise 114 in the receiver 116. The receiver 116 performs the channel estimation 118. The acknowledgement for the signal is done by a CRC check 120. If the CRC check is successful the uplink data 131 from the signal 127 is processed in the first base station 100. The transmit signal estimator 122 estimates the transmitted radio signal.

The rest signal 126 is buffered in the signal buffer 128. By knowing the signal 133 of the wireless appliance 102 the signal of the wireless appliance 102 inside the rest signal 126 can be identified. The analysis 130 of the rest signal 126 is done once for every uplink data 131 that is successfully received from the wireless appliance 102 whose connection is controlled by the first base station 100. If the signal 129 of the wireless appliance 102 inside the rest signal 126 of the second base station 104 is not above a certain threshold A the procedure 132 not to add the second base station 104 to the CoMP network for the wireless appliance 102 is triggered. Then the first base station 100 continues to analyze the signals for the next wireless appliance.

If the signal of the wireless appliance 102 inside the rest signal 126 is above the threshold A a second analysis 134 is carried out detecting if the signal inside the rest signal 126 is above a certain threshold B. If so, procedure 136 to transfer the control of the wireless uplink communication with the wireless appliance 102 to the second base station 104 is triggered.

If the signal of the wireless appliance 102 inside the rest signal 126 is not above the threshold B, procedure 138 is started to add a second base station 104 to the CoMP network as a slave to provide its rest signal for the first base station 100 regularly.

If the signal 129 of the wireless appliance 102 inside the rest signal 126 is not above the threshold B, procedure 138 is started to add a second base station 104 to the CoMP network as a slave to provide its rest signal for the first base station 100 regularly.

The thresholds A and B can be either fixed values, have a dynamical character or have a differential character so that the change of the received signal power is taken as the basis for the decisions.

Figure 4:
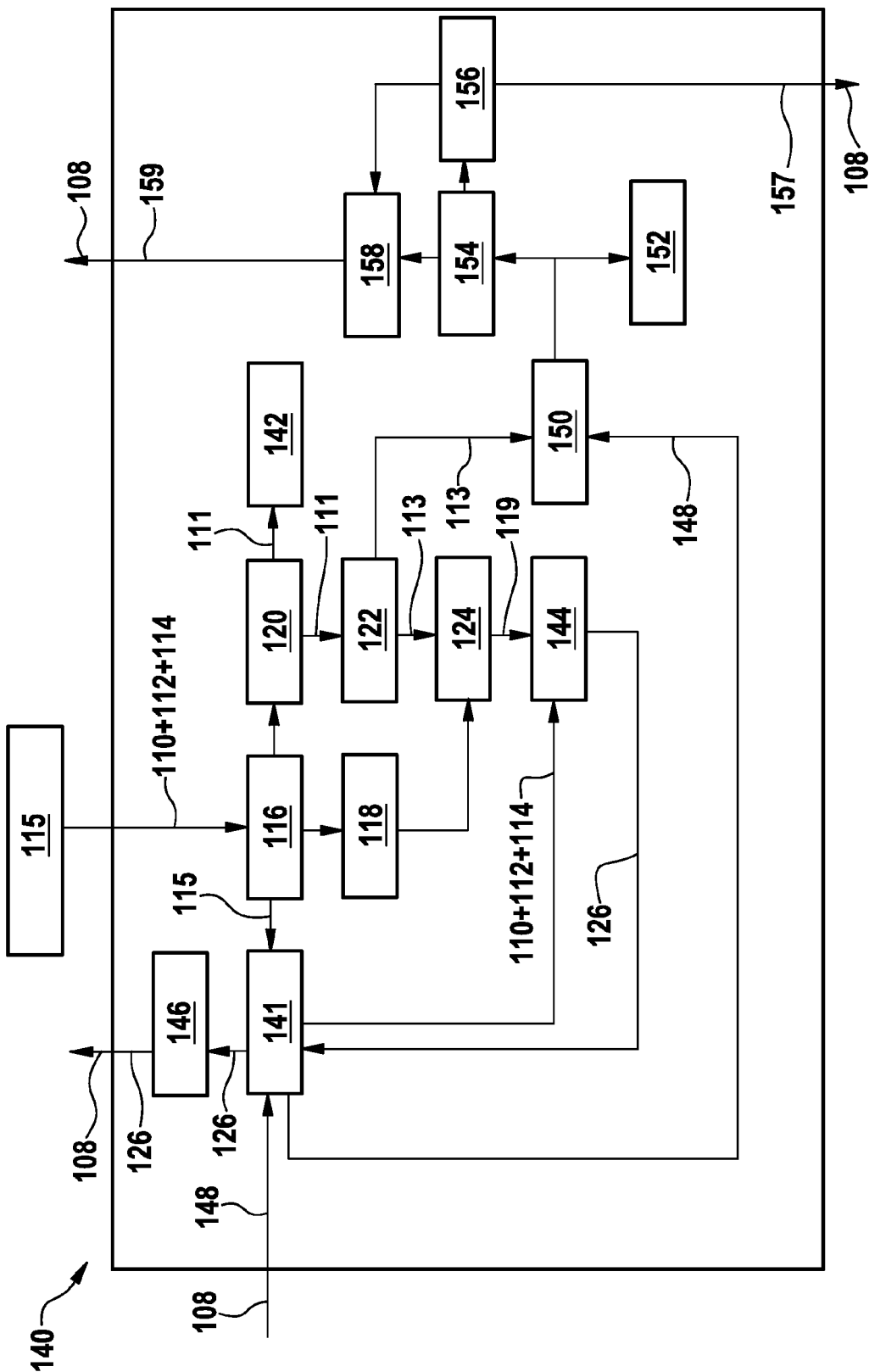
FIG. 4 is a block diagram illustrating a base station apparatus being operable to perform the methods according to the invention.

FIG. 4 is a block diagram illustrating a base station apparatus 140 being operable to perform the methods according to the invention. For example, this can be in a CoMP network where the base station apparatus can function as a CoMP master for a first plurality of wireless appliances and at the same time as a CoMP slave for a second plurality of wireless appliances.

The receiver 116 receives the signals of the first plurality of wireless appliances 110, interferences 112 and noise 114. The signals of the first plurality of wireless appliances 110, the interferences 112 and the noise 114 form together the signal 115. In the interferences 112 there are signals from the second plurality of wireless appliances.

The signal 115 is transmitted by the receiver 116 to the signal buffer 141 once per transmit time interval. The receiver 116 performs the channel estimation 118. The acknowledgement for the uplink data is done by a CRC check 120. If the CRC check 120 is successful the uplink data 111 from the signal 110 is processed by the means for processing uplink data 142. The transmit signal estimator 122 estimates the transmitted radio signal 113 for this uplink data 111. From this estimated signal 113 the estimated received signal 119 can be estimated in the received signal estimator 124 with the help of the channel estimation 118 that is done in the receiver 116.

Per received signal 110 the signal 110 is subtracted by the substracter 144 from the signal that is buffered in the signal buffer 141 consisting of the signal 110, the interferences 112 and the noise 114 such that the rest signal 126 consists of the interferences and the noise. The rest signal 126 is again buffered in the signal buffer 141 and then transmitted by means for sending the rest signal 126 to another base station apparatus via an X2 interface 108.

The rest signal 148 received from another base station apparatus is buffered in the signal buffer 141. By knowing the signals 110 of the first plurality of wireless appliances a suitable signal for a wireless appliance of the first plurality of wireless appliances can be identified in the rest signal 148 received from another base station apparatus. Means for analyzing the rest signal with regard to threshold A 150 analyze the rest signal 148 once for every signal that is estimated to be transmitted by the corresponding wireless appliance. If the suitable signal for the wireless appliance of the first plurality of wireless appliances inside the rest signal 148 is not above the threshold A means 152 perform the procedure to not to add the second base station to the CoMP network. Then the base station apparatus 140 continues to analyze the signals for the next wireless appliance.

If the suitable signal for the wireless appliance of the first plurality of wireless appliances inside the rest signal 148 is above the threshold A means 154 analyze the rest signal 148 with regard to threshold B. If the rest signal 148 is above the threshold B, means 156 for performing the procedure to change the master send a transfer request message 157 to the CoMP slave having sent the rest signal 148 via the X2 interface 108.

If the second base station declines the transfer of the control of the wireless appliance, means 158 perform the procedure to add the base station having sent the rest signal 148 to the CoMP network as a CoMP slave. The addition is done by an addition request message 159 via the X2 interface 108.

If the suitable signal inside the rest signal 148 is not above the threshold B, means 158 perform the procedure to add the base station having sent the rest signal 148 to the CoMP network as a CoMP slave. The addition is done by an addition request message 159 via the X2 interface 108.

The thresholds A and B can be either fixed values, have a dynamical character or have a differential character so that the change of the signal power is taken as the basis for the decisions.

LIST OF REFERENCE NUMERALS 100 first base station
102 wireless appliance
104 second base station
106 second base station
108 X2 interface
110 signals of other wireless appliances
111 uplink data of the signals of other wireless appliances
112 interferences
113 estimated transmit signal of the wireless appliance
114 noise
115 signals of other wireless appliances+interferences+noise
116 receiver
117 signal buffer of second base station
118 channel estimation
119 estimated received signal of the wireless appliance
120 CRC check
122 transmit signal estimator
124 received signal estimator
126 rest signal
127 signal of the wireless appliance
128 signal buffer of first base station
130 analysis of the rest signal with regard to threshold A
131 uplink data of the signal of the wireless appliance
132 procedure to not to add the second base station to the CoMP network
134 analysis of the rest signal with regard to threshold B
136 procedure to change the master
138 procedure to add the second base station to the CoMP network
140 base station apparatus
141 signal buffer
142 means for processing uplink data
144 substracter
146 means for sending rest signal
148 rest signal received from another base station
150 means for analyzing the rest signal with regard to threshold A
152 means for performing the procedure to not to add the second base station to the CoMP network
154 means for analyzing the rest signal with regard to threshold B
156 means for performing the procedure to change the master
157 transfer request message to change the master
158 means for performing the procedure to add the second base station to the CoMP network
159 addition request message to add a slave to the CoMP network

The invention claimed is:

1. A method of operating a first base station that is part of a wireless uplink communication with a wireless appliance, the method comprising:
the first base station controlling the wireless uplink communication with the wireless appliance,
the first base station receiving a first signal from the wireless appliance,
the first base station receiving a rest signal comprising interferences and noise from at least one second base station,
the first base station analyzing the rest signal from the at least one second base station for detecting a second signal from the wireless appliance that is above a threshold,
in response to detecting the second signal from the wireless appliance is above the threshold, the first base station adding at least one second base station to the coordinated multipoint wireless uplink communication with the wireless appliance by sending an addition request message to the at least one second base station.

2. The method of claim 1, wherein the rest signal contains the second signal from the wireless appliance that is above the threshold and the first base station determines whether to transfer the control of the wireless uplink communication connection with the wireless appliance to one of the at least one second base station and sends a transfer request message to the one of the at least one second base station.

3. The method of claim 2, wherein the first base station determines by comparing the second signal to the threshold whether the transfer request message is sent to the one of the at least one second base station and the control of the wireless uplink communication with the wireless appliance is transferred to one of the at least one second base station.

4. The method of claim 1, wherein the rest signal from the at least one second base station does not contain the second signal from the wireless appliance that is above the threshold and the first base station determines whether to ignore the rest signal from the at least one second base station for the uplink communication connection with the wireless appliance.

5. A non-transitory computer-usable data carrier storing instructions that, when executed by a computer, cause the computer to perform the method of claim 1.

6. A method of processing signals in a communication network, the method comprising:
a first base station receiving a rest signal comprising interferences and noise from a second base station, wherein the first base station controls the wireless uplink communication with the wireless appliance and is part of a coordinated multipoint wireless uplink communication with the wireless appliance;
determining whether the rest signal from the second base station contains a signal that is above a threshold;
in response to determining the rest signal from the second base station contains a signal that is above the threshold, the first base station adding the second base station to the coordinated multipoint wireless uplink communication with the wireless appliance.

7. The method of claim 6, wherein the first base station sends a transfer request message to the second base station and the control of the wireless uplink communication connection with the wireless appliance is transferred to the second base station.

8. The method of claim 6, wherein the rest signal from the second base station does not contain a signal that is above the threshold from a wireless appliance that is connected to the first base station via a wireless uplink communication connection controlled by the first base station.

9. The method of claim 6, wherein the second base station receives a transfer request message from the first base station and the control of the wireless uplink communication with the wireless appliance is transferred to the second base station.

10. A non-transitory computer-usable data carrier storing instructions that, when executed by a computer, cause the computer to perform the method of claim 6.

11. A base station apparatus configured to perform a method according to claim 1.

12. A base station apparatus configured to perform a method according to claim 6.

* * * * *